Figure 2:
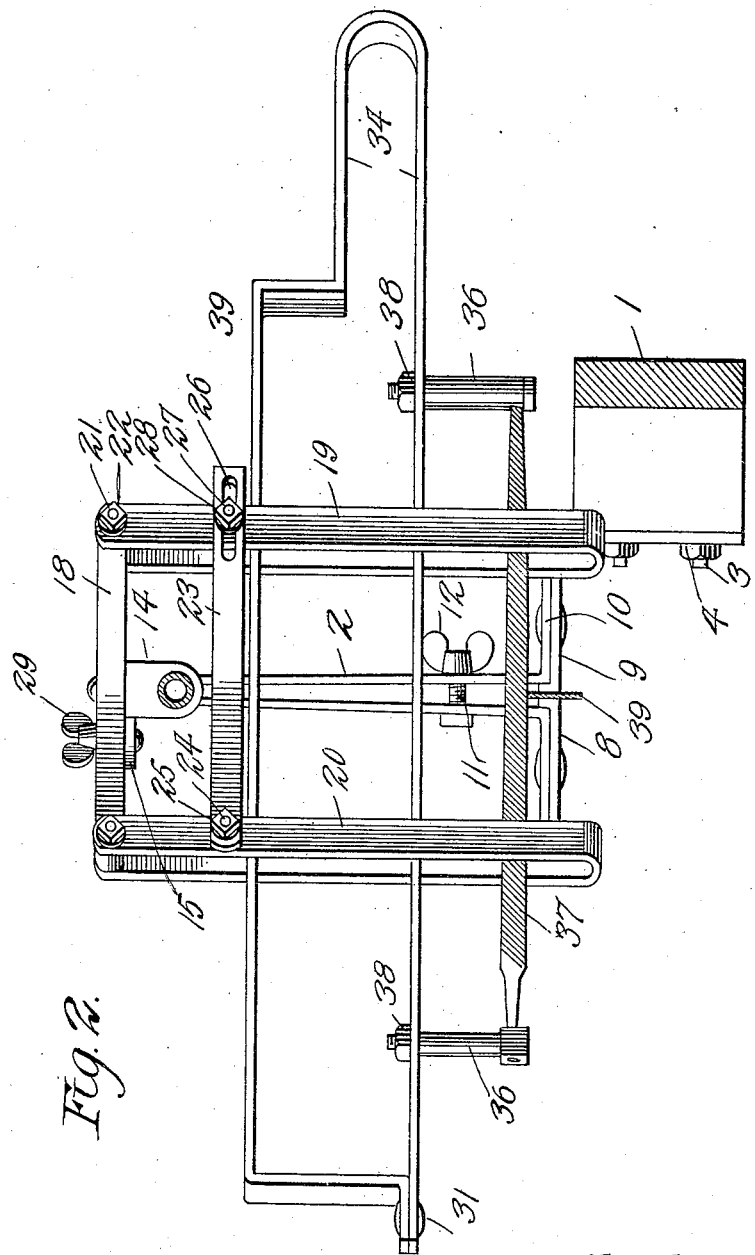

No. 863,446. PATENTED AUG. 13, 1907.
C. H. REYNOLDS.
SAW SHARPENING APPARATUS.
APPLICATION FILED DEC. 1, 1906.
2 SHEETS—SHEET 1.
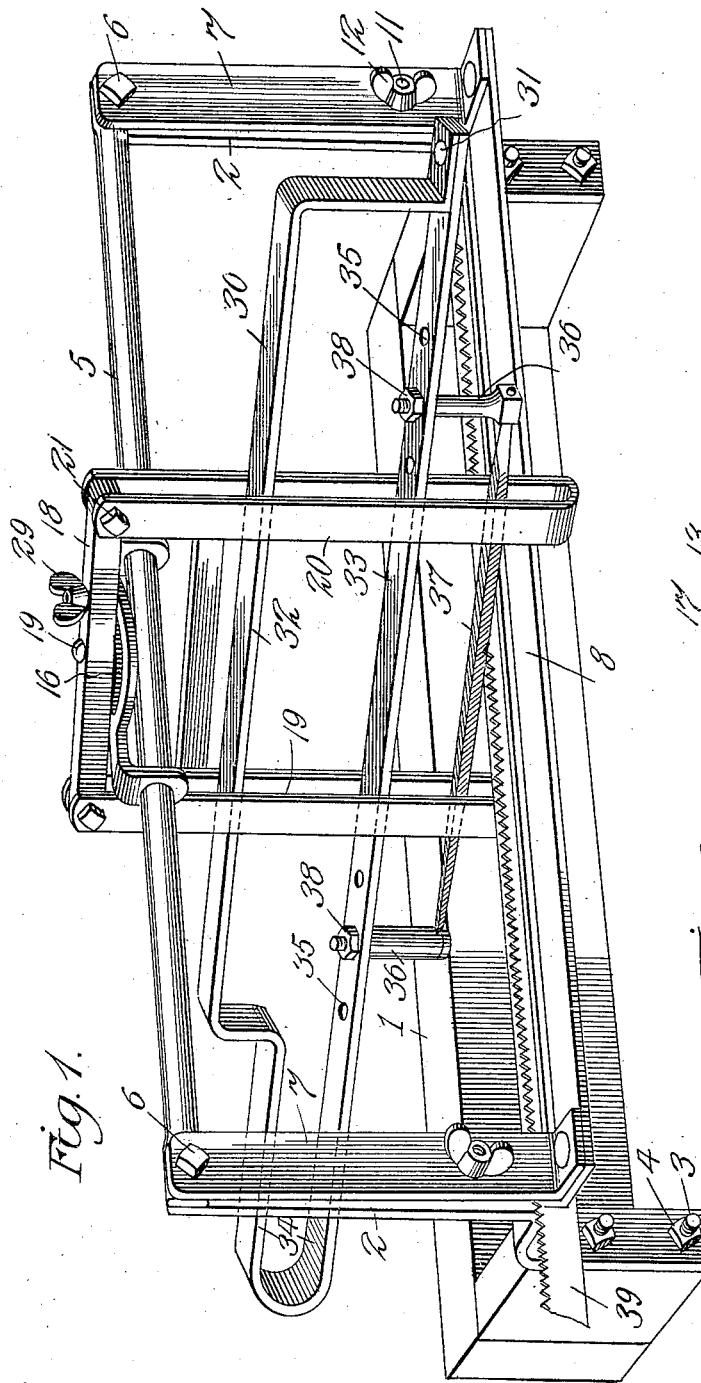
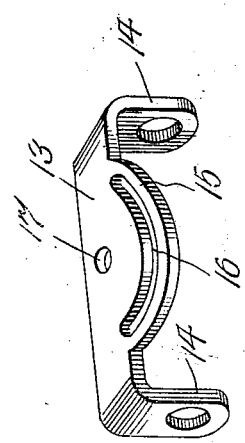
Fig. 1.
Fig. 3.
Witnesses
Inventor
Charles H. Reynolds
By Victor J. Evans
Attorney
THE NORRIS PETERS CO., WASHINGTON, D. C.

No. 863,446. PATENTED AUG. 13, 1907.
C. H. REYNOLDS.
SAW SHARPENING APPARATUS.
APPLICATION FILED DEC. 1, 1906.

2 SHEETS—SHEET 2.

Witnesses
Inventor
Charles H. Reynolds,
By Victor J. Evans
Attorney

UNITED STATES PATENT OFFICE.

CHARLES H. REYNOLDS, OF MILAN, MISSOURI.

SAW-SHARPENING APPARATUS.

No. 863,446.	Specification of Letters Patent.	Patented Aug. 13, 1907.

Application filed December 1, 1906. Serial No. 345,964.

*To all whom it may concern:*

Be it known that I, CHARLES H. REYNOLDS, a citizen of the United States of America, residing at Milan, in the county of Sullivan and State of Missouri, have invented new and useful Improvements in Saw-Sharpening Apparatus, of which the following is a specification.

This invention relates to saw sharpening apparatus, comprehending particularly an improvement in sharpening devices of that kind comprising a reciprocating file carrier operative within a carriage movable in a holding frame longitudinally of the saw, the carriage also being adjustable to set the file to cut at different working angles.

The object of the invention is to provide an improved construction of sharpening apparatus of this character wherein novel means are employed to admit of the adjustment of the carriage to set the file to cut at different angles and of the ready reversal of the carriage from one position to another.

A further object is to generally simplify and improve the construction of the frame, carriage, file holder and adjusting means, whereby increased advantages are afforded.

In the accompanying drawings,—Figure 1 is a perspective view of a saw filing apparatus embodying my invention. Fig. 2 is a vertical transverse section thereof. Fig. 3 is a perspective view of the guide bracket.

The device comprises a frame embodying a base 1, from which rise vertical end standards 2, secured at their lower ends to the base in any preferred manner, as by bolts 3 and clamping nuts 4. A longitudinal guide rod 5 extends between the upper ends of the standards and is secured thereto by bolts 6, and secured also by these bolts to the rod and standards are hanger arms 7 which are arranged substantially in parallel relation to the standards and carry at their lower ends a clamping bar 8 adapted to bear against one of the faces of the saw. A similar clamping bar 9 is secured to the lower offset portions 10 of the standards 2 and is adapted to bear against the opposite side of the saw, the two bars serving to clamp the saw rigidly in position upon the frame during the operation of sharpening the teeth thereof. The upper ends of the hanger arms 7 may be hung loosely upon the bolts 6 to permit said arms to be adjusted toward and from the standards, or the arms may be sufficiently resilient for this purpose, so that the clamping bar 8 may be adjusted relatively to the bar 9 to admit and clamp saws of different thicknesses between them. Bolts 11 connect the lower ends of the hanger arms with the standards 2 and are equipped with wing nuts 12, whereby the bar 8 may be secured in adjusted position to clamp the blade of the saw against the bar 9.

A guide bracket or head plate 13 is provided with depending perforated lugs 14 slidably engaging the rod 5 and is formed at its rear side with an arcuate extension 15 provided with a similarly shaped slot 16, and at the center of the body of the bracket is formed an opening 17 for pivotal connection of the saw carriage therewith.

The carriage comprises a head bar 18 pivotally supported upon the guide bracket by a pivot pin or bolt 19 arranged to turn in the opening 17. This bar projects transversely of the guide bar 5 and carries at its ends depending guide members 19 and 20. These members are preferably formed of U-shaped strips having the free ends of their arms embracing the ends of the head bar and pivotally secured thereto by bolts 21 provided with securing nuts 22, the lower ends of the guide members extending down low enough to abut against the outer edges of the clamping bars 8, as hereinafter described.

A brace 23 connects the guide members and is pivotally secured to one of the guide members by a bolt 24 and coacting nut 25 and is formed at its opposite end with a longitudinal slot 26 through which passes a bolt 27 carried by the other guide member, said bolt being provided with a nut 28 to clamp the slotted end of the brace in adjusted position. This brace prevents the guide members from moving either inward or outward when the carriage is adjusted for operation, and yet permits of the relative adjustment of said guide members to permit the carriage to be set at different working angles. A bolt 29 passes upward through the guide slot 16 in the bracket 13 and through the head bar 18, and has its head arranged to bear against the underside of the bracket extension 15. This bolt is adapted to slide in the slot 16 to permit the carriage as a whole to swing upon the pivot 19 for adjustment to different angles relative to the frame, a wing nut 29′ being provided upon the upwardly projecting end of the bolt to clamp the bar 18 in adjusted position upon the guide bracket.

The file carrier 30 is arranged for reciprocation in the guide members 19 and 20, and, as shown, comprises a metallic strip bent into loop-form, the free ends of the strip being permanently united by a rivet or other suitable fastening 31. The upper arm or bar 32 of the carrier is offset at its rear end to bring it into closer proximity to the rear end of the lower bar 33 to form a handle 34 of convenient size to be gripped by the hand of the operator. The lower arm or bar is provided with two sets or series of openings 35 for adjustable connection therewith of depending file supports 36 to which the ends of the file 37 may be detachably connected in any preferred manner. The upper ends of the supports 36 terminate in threaded stems which pass through one opening of each set 35 and are fitted with clamping nuts 38 to fasten them in position. This construction permits the file to be adjusted longitudinally on the carrier to suit different conditions of service.

In operation, the blade of the saw 39 is clamped vertically between the clamping bars 8 and 9 and the carriage swung on its pivotal support 19 to adjust the file 37 at the proper angle to conform to the set of one of the series of saw teeth, thus adapting the file for operation successively on such teeth while the carriage is moved in one direction on the guide bar 5.

In order to steady the carriage during the operation of the file holder, the construction is such as to adapt the lower ends of the guide members 19 and 20 to abut directly against the clamping bars 8 and 9 when the carriage is set in working position, in which it is additionally secured by the clamping bolt 29 and nut 29'. The link or brace 23 is adjustably connected with the guide member 19 to permit the guide members 19 and 20 to be spaced a greater or less distance apart, so that they may be adjusted to abut against the clamping bars irrespective of the working angle to which the carriage may be adjusted. After the parts have been disposed for operation in the manner described, the file is reciprocated to sharpen one tooth, after which the carriage is shifted to bring the file in position to be reciprocated to sharpen the next adjacent tooth set in the same direction, and so on, until all the teeth set in one direction are sharpened during the movement of the carriage in one direction on the bar 5.

Upon relaxing the nut 29' the carriage may be swung around on the pivot 19 to set the file to work at a reverse oblique angle, so that the other set of teeth may be sharpened in the manner described by the reverse travel of the carriage on the guide rod 5. Hence it will be seen that the carriage may be adjusted in a ready and convenient manner to set the file to cut at different angles and to be reversed to first act upon teeth set in one direction and then upon teeth set in the opposite direction, and that the carriage may be as conveniently moved longitudinally in different directions on the frame to successively bring the file into engagement with the teeth, whereby the operation of sharpening a saw may be conveniently and expeditiously performed.

The carriage may yield sufficiently in practice to adapt the lower ends of the guide members 19 and 20 to be thrown sufficiently out of engagement with the clamping bars to permit the carriage to be adjusted longitudinally without the necessity of adjusting the clamping nut 29', as will be readily understood.

Having thus described the invention, what is claimed as new, is:—

1. In a saw filing apparatus, a frame provided with co-acting saw clamping bars and a guide rod above the same, a carriage slidably and pivotally mounted upon said rod and having pivotally supported depending guide members adapted to bear at their lower ends against the clamping bars, a brace adjustably connecting said guide members, and a reciprocating file carrier adapted to move therethrough.

2. In a saw filing apparatus, the combination of a frame provided with fixed and movable saw clamping bars and a guide rod disposed above the same, a bracket slidable on the rod, a carriage comprising a head bar pivoted to the bracket and looped guide members pivotally connected with and depending from said bar, a clamp for adjustably connecting the head bar with the bracket, a brace adjustably connecting the depending guide members, and a reciprocating file carrier movable through said guide members.

In testimony whereof, I affix my signature in presence of two witnesses.

CHARLES H. REYNOLDS.

Witnesses:
ED. N. WATSON,
JNO. W. BINGHAM.